July 27, 1926.
F. HENKE
THROTTLE MECHANISM
Filed July 19, 1924    3 Sheets-Sheet 3
1,594,331
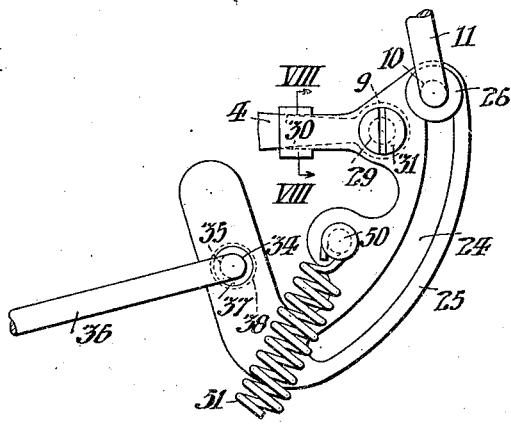
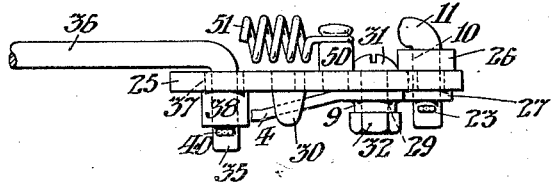
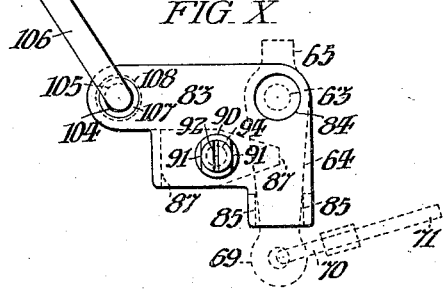
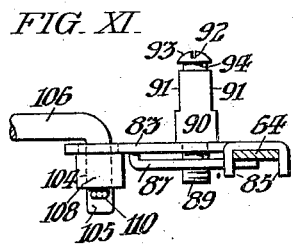
INVENTOR:
FREDERICK HENKE, Patented July 27, 1926.

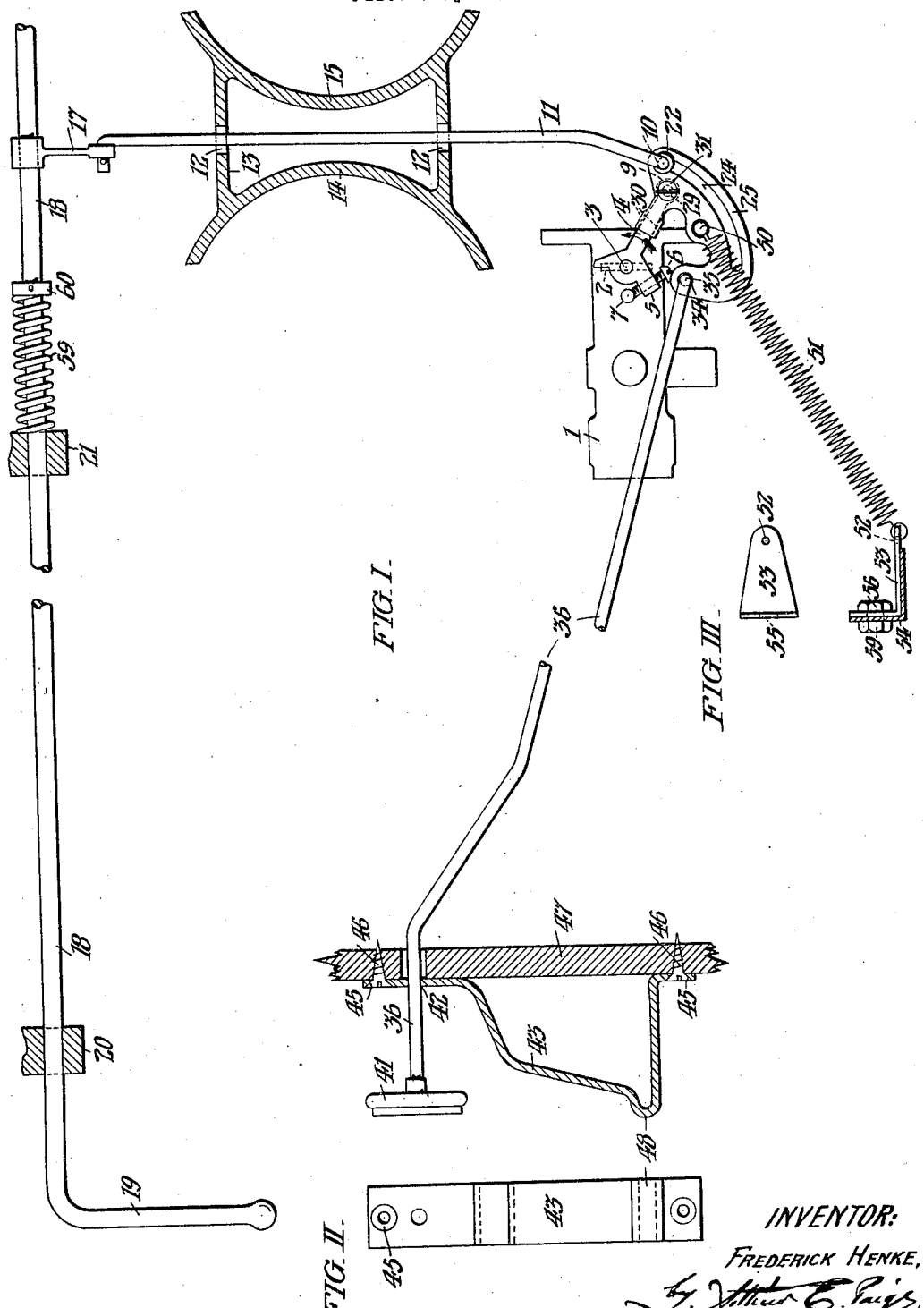

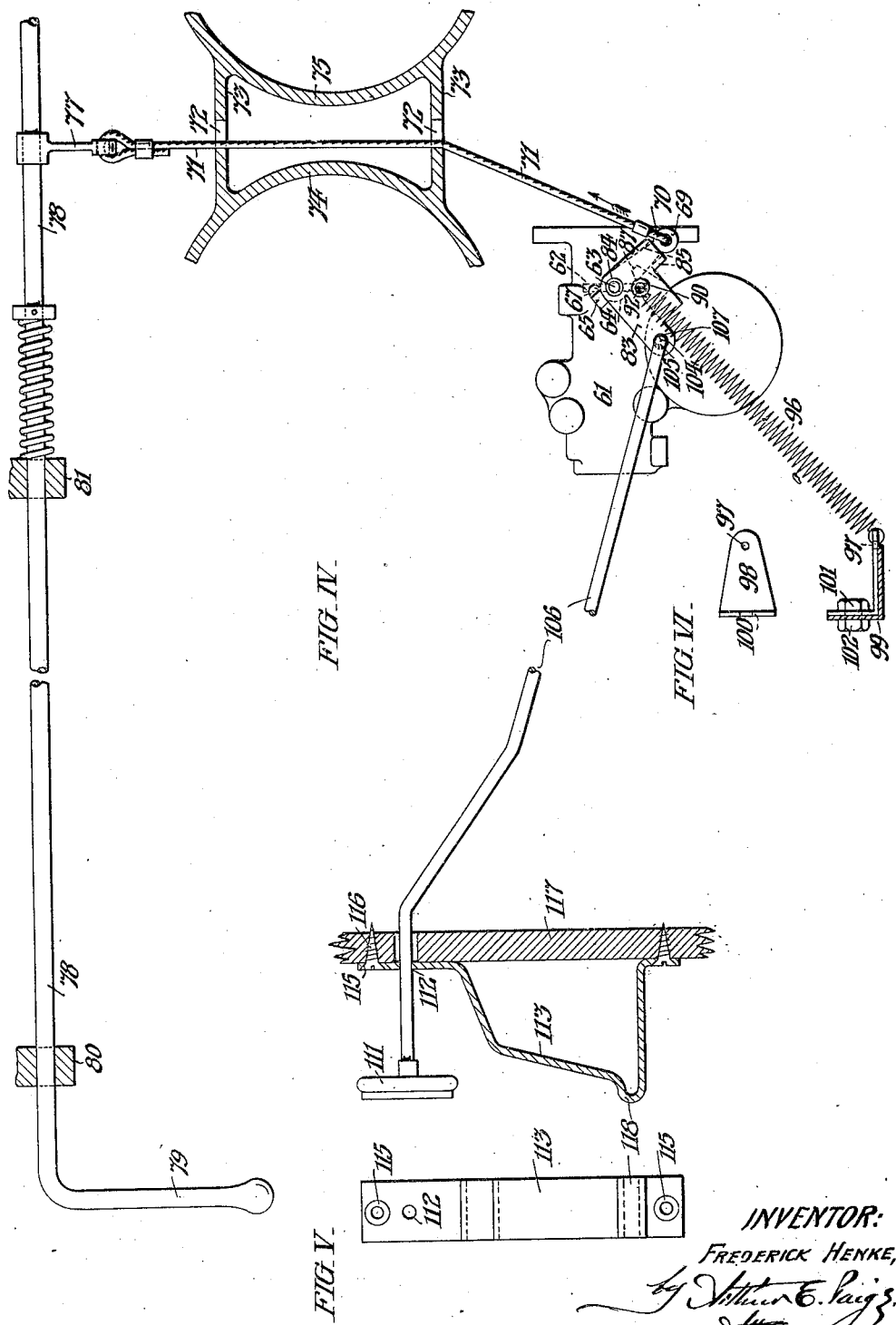

1,594,331

UNITED STATES PATENT OFFICE.

FREDERICK HENKE, OF PHILADELPHIA, PENNSYLVANIA, ASSIGNOR TO FOX AUTOMATIC PRODUCTS CORPORATION, OF PHILADELPHIA, PENNSYLVANIA, A CORPORATION OF PENNSYLVANIA.

THROTTLE MECHANISM.

Application filed July 19, 1924. Serial No. 727,038.

My invention is particularly applicable to carburetor throttle mechanism whereby acceleration of an automobile motor is effected and the form thereof hereinafter described is especially designed as an accessory for "Ford" automobiles. Ordinarily, such automobiles are provided only with means for controlling the carburetor throttle lever by manipulation of a hand lever extending immediately below the steering wheel. The object and effect of the form of my invention hereinafter described is to provide an accessory device which enables the operator to accelerate said motor by foot pressure, without disturbing the hand lever aforesaid from the position to which it has been set; such form of my invention including a spring which restores the foot accelerator to its normal idle position when released.
Of course, the effect of such construction and arrangement is that while the operator is enabled to adjust said hand lever, as heretofore, to determine a normal rate of traverse of the car, he is also enabled to temporarily increase such rate by the operation of my accessory device, without disturbing that adjustment.

As hereinafter described, my invention includes an accessory adapter plate, preferably formed of pressed sheet metal, having spaced flanges and screw clamping means coordinately adapted for rigidly connecting said plate with an ordinary carburetor valve lever. Said adapter plate is pivotally connected with a foot accelerator rod having a pedal extending above the floor of the automobile, with said rod mounted to slide in a foot rest attached to said floor. In the preferred form of my invention hereinafter described, the ordinary hand connecting element has a crank at the end intended for pivotal connection with an eye at the end of said valve lever, but, instead of being thus connected, said crank is fitted to traverse a slot in said adapter plate with said slot extending in concentric relation with the fulcrum of said lever. Such construction and arrangement permit operation of said valve lever by said pedal without movement of the hand accelerator; while the crank end of the latter idly traverses said slot in said plate. However, said spring, which returns said adapter plate to normal idle position, presents the end of said arcuate slot against said crank, so that said plate and the valve lever connected therewith may be directly actuated by movement of said hand accelerator device.

My invention includes the various novel features of construction and arrangement hereinafter more definitely specified.

In said drawings; Fig. I is a diagram including sectional views showing a preferred embodiment of my invention in connection with parts of a "Ford" automobile, some of which are shown in fragmentary section; the hand accelerator connector extending to the carburetor lever being of the rigid type ordinarily furnished with "Ford" cars.

Fig. II is a rear elevation of the foot rest shown in section in Fig. I attached to the automobile foot board.

Fig. III is a plan view of the spring bracket shown in Fig. I attached to the angle bar dash support of the automobile.

Fig. IV is a diagrammatic view similar to Fig. I, but showing a modified form of my invention, wherein the hand connector for the carburetor lever is flexible. This form of my invention is especially designed for use in connection with a "Stromberg" carburetor.

Fig. V is a rear elevation of the foot rest shown in section in Fig. IV attached to the automobile foot board.

Fig. VI is a plan view of the spring bracket shown in Fig. IV attached to the angle bar dash support of the automobile.

Fig. VII is an elevation of the form of my accessory sectoral adapter plate shown in Fig. I, but on a larger scale.

Fig. VIII is a fragmentary sectional view taken on the line VIII, VIII in Fig. VII, showing the flanges on said plate which rigidly engage the carburetor lever between them.

Fig. IX is an elevation of the lower edge of the parts shown in Fig. VII.

Fig. X in an elevation of the form of my accessory adapter plate shown in Fig. IV, but on a larger scale.

Fig. XI is an elevation of the lower edge of the parts shown in Fig. X, but with the carburetor valve lever in section.

However, the specific form of my invention shown in Figs. IV, X and XI is claimed in my copending application Serial No. 758,474, which is a division of this application.

Referring to the form of my invention shown in Figs. I to III inclusive; 1 is an automobile carburetor of the configuration ordinarily furnished with a "Ford" car and inclosing a throttle valve 2 which may be oscillated by means of its trunnion 3 which is rigidly connected with the valve lever 4. Said lever 4 has the arm 5 provided with the adjustable set screw 6 which encounters the stationary stop 7 which projects from said carburetor 1 and thus limits the movement of said lever 4 in one direction and determines the normal position of said valve 2, which is the closed position indicated in Fig. I. Said lever 4 has the end eye 9 which is normally adapted for connection with the right angular bent crank end 10 of the hand accelerator connector rod 11. Said rod 11 extends through openings 12 in the webs 13 connecting the cylinders 14 and 15 of the automobile motor, and is pivotally connected at its upper end with the hand operative accelerator arm 17. Said arm is part of the hand lever which includes the fulcrum shaft 18 which extends in the automobile steering column and has the handle arm 19 at its upper end arranged to adjustably set it in different positions of rotation with respect to its bearings 20 and 21.

However, as shown in Figs. I, VII and IX, said crank end 10 of the hand accelerator connector rod 11 is removed from said lever eye 9 and fitted to slide in the arcuate slot 24 in the sectoral accessory adapter plate 25 in which said crank is retained by the cotter pin 23, with the washers 26 and 27 upon respectively opposite sides of said plate. As indicated by the dotted lines in Fig. IX; said washer 26 extends through said said plate 25 in connection with said washer 27; so that they form, in effect, a roller extending through said slot 24 with circumferential retaining flanges upon opposite sides of said plate 25. Said adapter plate 25 has the bolt hole 29 adapted to register with said lever eye 9, and a pair of lugs 30, best shown in Fig. VIII, spaced to fit and rigidly hold said lever 4 between them with said plate 25 rigidly connected with said lever by the bolt 31 extending through said plate 25 and eye 9 and provided with the nut 32 exterior to the latter, as best shown in Fig. IX.

When said plate 25 is thus rigidly connected with said carburetor throttle lever 24; said arcuate slot 24 is preferably in concentric relation with the fulcrum of said lever which is the axis of said valve trunnion 3. Said adapter plate 25 has the eccentric hole 34 for the right angular bent end 35 of the foot accelerator rod 36; which rod end 35 is journaled in the bushing 37 which extends in said plate hole and projects from one side of said plate as a cylindrical bearing sleeve 38 in rigid relation with said plate 25, as best shown in Fig. IX. The cotter pin 40, shown in Fig. IX, normally retains said foot accelerator rod end 35 in such pivotal connection with said plate 25. As shown in Fig. I; said foot rod 36 has the pedal 41 rigidly mounted upon one end thereof and extends through the bearing hole 42 in the foot rest 43 which comprises a metal strip having screw holes 45 at opposite ends thereof for the screws 46 which rigidly connect said foot rest 43 with the foot board 47 of the automobile. Said foot rest 43 has the heel flange 48 near its end opposite to said bearing hole 42 and is adapted to support the foot of the operator in convenient position to operate the foot accelerator device above described. Said foot rest 43 thus supports, and limits the movement of, said foot rod 36, and facilitates the operation of said foot accelerator device shown in Fig. I.

As shown in Figs. I, VII and IX; said accessory adapter plate 25 is provided with the spring holder stud 50 projecting from the side thereof opposite to said sleeve 37 and connected with one end of the spring 51 which has its opposite end engaged in the spring hole 52 in the spring bracket 53 which has its opposite ends bent in right angular relation with each other, to fit the angle bar dash support 54 of the automobile; said spring bracket having the bolt hole 55 at its opposite end for the bolt 56 which extends through said bracket and angle bar and is provided with the nut 57 rigidly securing said bracket to said bar.

It may be observed that the arrangement above described is such that in the position shown in Fig. I, wherein the throttle valve 2 is closed; said lever 4 may be turned to open said valve more or less by the movement of said adapter plate 25, either by the hand connector 11 or the foot connector 36; but that if the hand accelerator lever 19 be set to open said valve 2 to a certain extent; by means of said hand connector 11 with its roller 22 engaging the end of the slot 24 in said adapter plate 25, which would move said valve lever 4 in the direction of the arrow marked thereon in Fig. I; said lever may be moved to a greater extent, in the same direction, to accelerate the operation of the motor, by pressure upon said pedal 41 and foot rod 36, against the tension of said spring 51; such movement of the foot accelerator being effected without movement of the hand connector 11; the roller 22 of the latter idly traversing said slot 24 in said adapter plate 25. However, when said foot accelerator is released by the operator;

the tension of said spring 51 restores said plate 25 and the lever 4 connected therewith to the original position by presenting the end of said slot 24 against said roller 22. It is to be particularly noted that the hand accelerator lever, including the arm 17, shaft 18 and arm 19, is normally held in any desired position of rotary adjustment, by means of the compression spring 59 which is confined between said bearing 21 and the collar 60 on said fulcrum shaft 18, and that the tension of said spring 51 is merely sufficient to restore said sectoral adapter plate 25 to cooperative relation with said hand connector 11 when pressure is removed from the foot accelerator pedal 41.

Referring to the form of my invention shown in Figs. IV to VI inclusive; 61 is an automobile carburetor of the "Stromberg" type and inclosing a throttle valve 62 which may be oscillated by means of its trunnion 63 which is rigidly connected with the valve lever 64. Said lever 64 has the arm 65 arranged to encounter the stationary stop 67 which projects from said carburetor 61 and thus limits the movement of said lever 64 in one direction and determines the normal position of said valve 62, which is the closed position indicated in Fig. IV. Said lever 64 has the end eye 69 which is pivotally connected with the loop end 70 of the flexible hand accelerator connector 71, which is conveniently formed of a piece of steel cable. Said connector 71 extends through openings 72 in the webs 73 connecting the cylinders 74 and 75 of the automobile motor, and is pivotally connected at its upper end with the arm 77 of the hand lever which includes the fulcrum shaft 78 which extends in the automobile steering column and has the handle arm 79 at its upper end arranged to adjustably set it in different positions of rotation with respect to its bearings 80 and 81.

The hand accelerator device last above described is, of course, capable of shifting said throttle valve lever 64 only in the direction of the arrow marked thereon in Fig. IV, as movement of the hand lever arm 77 in the opposite direction merely serves to release the tension on said connector 71; but thus permits said lever 64 to be restored to its normal porition by other means. In this form of my invention, I provide said lever 64 with the accessory adapter plate 83 which has the opening 84 registering with said valve pintle 63, and has a pair of lugs 85, indicated in Fig. IV, and shown in detail in Figs. X and XI, which lugs are spaced to fit and rigidly hold said lever 64 between them in the position shown in said Figs. IV, X and XI; in which position said plate 83 is clamped upon said lever 64 by the plate tongue 87 which is formed of the same piece of metal as said plate 83 but bent parallel therewith so as to extend beneath said lever 64, as shown in Figs. X and XI. Said tongue has a screw threaded hole for engagement with the screw threaded end 89 of the screw stud 90 which is primarily cylindrical but has its opposite sides 91 flattened, as best shown in Fig. X, to be engaged by a wrench, and also has the screw driver slot 92 in its head 93; whereby said stud may be set in the position shown in rigid relation with said plate 83 and lever 64 or may be detached for repairs. Said screw stud 90 has the neck 94 adjoining its head 93 for engagement with one end of the spring 96 shown in Fig. IV, which has its opposite end engaged in the spring hole 97 in the spring bracket 98 which has its opposite ends bent in right angular relation with each other to fit the angle bar dash support 99 of the automobile; said spring bracket having a bolt hole 100 at its opposite end for the bolt 101 which extends through said bracket and angle bar and is provided with the nut 102 rigidly securing said bracket to said bar.

As shown in Figs. IV, X and XI; said accessory adapter plate 83 has the eccentric hole 104 for the right angle bent end 105 of the foot accelerator rod 106; which rod end 105 is journaled in the bushing 107 which extends in said plate hole and projects from one side of said plate as a cylindrical bearing sleeve 108, in rigid relation with said plate 83, as best shown in Fig. XI. The cotter pin 110, shown in Fig. XI, normally retains said foot accelerator rod end 105 in such pivotal connection with said plate 83. As shown in Fig. IV; said foot rod 106 has the pedal 111 rigidly mounted upon one end thereof and extends through the bearing hole 112 in the foot rest 113 which comprises a metal strip having screw holes 115 at opposite ends thereof for the screws 116 which rigidly connect said foot rest 113 with the foot board 117 of the automobile. Said foot rest 113 has the heel flange 118 near its end opposite to said bearing hole 112, and is adapted to support the foot of the operator in convenient position to operate the foot accelerator device above described with reference to Fig. IV. Said foot rest 113 thus supports, and limits the movement of, said foot rod 106, and facilitates the operation of said foot accelerator device shown in Fig. IV. The arrangement of that device is such that in the position shown in Fig. IV, wherein the throttle valve 62 is closed; said lever 64 may be turned to open said valve more or less either by the movement of said hand connector 71 or foot connector 104. However, if the hand accelerator lever 79 be set to open said valve 62 to a certain extent; the operation of my accessory throttle mechanism shown in Fig. IV does not disturb said hand lever 79 from its set position; the movement of said valve lever 64 by the foot accelerator merely serving to slacken and flex the hand connector 71 until said spring 96 restores the parts to the normal position shown in Fig. IV.

It may be observed that in each of the forms of my invention above described, the adapter which renders the foot accelerating device cooperative with the hand accelerating device is a single piece of metal having coordinated flanges and screw clamping means for rigidly connecting it with the lever of the throttle valve to be controlled and, incidentally, such adapter element is the medium through which spring pressure is applied to said lever to restore it to normal position when released. Of course, such adapter elements may be made of different forms and specific construction in accordance with the different construction and arrangement of the automobile structures to which they are accessory.

Therefore, I do not desire to limit myself to the precise details of construction and arrangement herein set forth, as it is obvious that various modifications may be made therein without departing from the essential features of my invention, as defined in the appended claims.

I claim:

1. An accessory foot accelerator, for an automobile carburetor valve having an operating lever; including a sectoral accessory adapter plate, having a bolt hole adapted to register with a hole in said lever, a pair of lugs spaced to fit said lever between them, an arcuate slot, in concentric relation with the fulcrum of said lever, a hole eccentric to said fulcrum, a bushing extending in the latter hole and projecting from one side of said plate, forming a cylindrical tubular bearing sleeve in rigid relation with said plate and adapted to receive a connector rod, and a stud projecting from the opposite side of said plate, in eccentric rigid relation therewith and having means to engage a spring; a roller fitted to traverse said slot and having means retaining it in said slot, including circumferential retaining flanges upon opposite sides of said plate; said roller having an axial opening therethrough adapted to receive a second connector rod.

2. An accessory foot accelerator, for an automobile carburetor valve having an operating lever; including a sectoral accessory adapter plate, having adjustable means arranged to rigidly connect it with said lever, and having an arcuate slot, in concentric relation with the fulcrum of said lever, a tubular bearing sleeve rigidly projecting from one side of said plate, and adapted to receive a connector rod, and a stud projecting from the opposite side of said plate, in eccentric rigid relation therewith and having means to engage a spring; and a roller fitted to traverse said slot and having means retaining it in said slot, including retaining flanges upon opposite sides of said plate; said roller having an axial opening therethrough adapted to receive a second connector rod.

3. An accessory foot accelerator, for an automobile carburetor valve having an operating lever; including a sectoral accessory adapter plate, having a bolt hole adapted to register with a hole in said lever; a pair of lugs spaced to fit said lever between them, an arcuate slot, in concentric relation with the fulcrum of said lever, a hole eccentric to said fulcrum, a bushing extending in the latter hole and projecting from one side of said plate, forming a cylindrical tubular bearing sleeve in rigid relation with said plate and adapted to receive a connector rod, and a stud projecting from the opposite side of said plate, in eccentric rigid relation therewith and having means to engage a spring; and means arranged to engage a connector rod in said slot.

In testimony whereof, I have hereunto signed my name at Philadelphia, Pennsylvania, this 16th day of July, 1924.

FREDERICK HENKE.

Certificate of Correction.

It is hereby certified that the assignee in Letters Patent No. 1,594,331, granted July 27, 1926, upon the application of Frederick Henke, of Philadelphia, Pennsylvania, for an improvement in "Throttle Mechanism," was erroneously described and specified as "Fox Automatic Products Corporation," whereas said assignee should have been described and specified as *Fox Automotive Products Corporation,* as shown by the records of assignments in this office; page 3, line 52, for the misspelled word "porition" read *position;* and that the said Letters Patent should be read with these corrections therein that the same may conform to the record of the case in the Patent Office.

Signed and sealed this 24th day of August, A. D. 1926.

[SEAL.]
M. J. MOORE,
*Acting Commissioner of Patents.*